United States Patent
Schloegl

(10) Patent No.: US 9,362,643 B2
(45) Date of Patent: Jun. 7, 2016

(54) COUPLING ARRANGEMENT AND COUPLING PIECE

(75) Inventor: Gerhard Schloegl, Wenberg-Koeblitz (DE)

(73) Assignee: Hilde Schloegl, Wemberg-Koeblitz (DE)

( * ) Notice: Subject to any disclaimer, the term of this patent is extended or adjusted under 35 U.S.C. 154(b) by 210 days.

(21) Appl. No.: 13/824,261

(22) PCT Filed: Aug. 31, 2011

(86) PCT No.: PCT/DE2011/001672
§ 371 (c)(1),
(2), (4) Date: Jul. 30, 2014

(87) PCT Pub. No.: WO2012/034552
PCT Pub. Date: Mar. 22, 2012

(65) Prior Publication Data
US 2014/0335710 A1  Nov. 13, 2014

(30) Foreign Application Priority Data
Sep. 15, 2010  (DE) .......................... 10 2010 045 523

(51) Int. Cl.
*H01R 13/00* (2006.01)
*F16L 25/01* (2006.01)
*H02G 15/22* (2006.01)

(52) U.S. Cl.
CPC .............. *H01R 13/005* (2013.01); *F16L 25/01* (2013.01); *H02G 15/22* (2013.01)

(58) Field of Classification Search
USPC ................ 439/191, 188, 427; 420/17; 403/24
See application file for complete search history.

(56) References Cited

U.S. PATENT DOCUMENTS

| | | | | |
|---|---|---|---|---|
| 4,806,114 A | * | 2/1989 | Hopper | H01R 13/523 439/191 |
| 9,010,434 B2 | * | 4/2015 | Rocke | E21B 17/028 137/15.06 |
| 2004/0023550 A1 | * | 2/2004 | Frisch | F16L 11/127 439/427 |
| 2004/0137773 A1 | * | 7/2004 | Ostergaard | H01R 13/523 439/188 |
| 2009/0123221 A1 | * | 5/2009 | Marshall | F16L 37/32 403/24 |
| 2009/0123321 A1 | * | 5/2009 | Shin | C22C 37/04 420/17 |

FOREIGN PATENT DOCUMENTS

EP  2327916  6/2011

* cited by examiner

*Primary Examiner* — Alexander Gilman
(74) *Attorney, Agent, or Firm* — Emerson Thomson Bennett, LLC; Daniel A. Thomson

(57) ABSTRACT

A coupling arrangement for a line for transmitting high power electrical energy as well as for transmitting a pressurized fluid, the line having at least one fluid channel and at least one electrical conductor, consisting of a first and second coupling piece, in each case comprising at least one fluid channel and at least one electrical connecting element, wherein, in a coupled position of the first and second coupling piece, a liquid-tight connection of the fluid channels and an electrically conductive connection exists between the electrical connecting elements and, in a decoupled position of the first and second coupling piece, the fluid channels and the electrical connecting elements are separated from one another, wherein the coupling arrangement encompasses an intermediate position, which is provided between the coupled and decoupled position, in which the first and second coupling piece are connected to one another in a liquid-tight manner.

15 Claims, 4 Drawing Sheets

COUPLING ARRANGEMENT AND COUPLING PIECE

This application is a national stage entry under 35 USC §371 of PCT/DE2011/001672. The invention relates to a coupling arrangement.

To date, the energy transmission of high powers in the field of motor vehicles, commercial vehicles, construction and agricultural machinery takes place via hydraulic and/or mechanical concepts. Increasingly, attempts are made to use electric motors, the electrical energy of which is provided by a generator, which is driven by means of an internal combustion engine, in the case of a traction drive as well as in response to driving auxiliary equipment. For this purpose, it is necessary to provide the vehicle with an electrical network, to which any electrical generators and consumers, such as an electric generator, a traction drive, auxiliary equipment or electrically driven equipment, for example, can be coupled.

To be able to transmit high electrical power in such an electrical network, it is advantageous to cool the electrical conductors by means of a cooling liquid, so as to thus be able to minimize the necessary conductor cross section in the case of a predetermined power, which is to be transmitted. In the context of this invention, high electrical powers are in particular understood to be powers in the range of between 50 KW and 300 KW with an electrical current of between 50 A and 400 A.

Coupling arrangements, which in addition to an electrical connection also establish a connection of the respective cooling channels of the electrical cables, are required for connecting the electrical generators or consumers, respectively, to such an electrical network or to couple conductor pieces, respectively.

When an error occurs in an electrical network, for example in response to a short-circuit, it is necessary to decouple parts of the electrical network or to divide the electrical network into partial networks, respectively, so as to provide for a localization of the error, so as to localize the area, in which the error occurs.

Based on this, the invention is based on the task of specifying a coupling arrangement, which simplifies maintenance operations on a network, which transmits electrical energy and coolant. Based on the preambles of patent claims 1 and 16, the task is in each case solved by the characterizing features thereof.

The significant aspect of the coupling arrangement according to the invention is to be seen in that the coupling arrangement encompasses an intermediate position provided in the transition region between the coupled position and the decoupled position, in which the first and second coupling piece are connected to one other in a liquid-tight manner, but there is no electrically conducting connection and in that provision is made for means for securing the first and/or second coupling piece in the intermediate position. Due to the embodiment according to the invention, the line network, which is embodied for transmitting electrical energy and a pressurized fluid, can in each case be separated electrically at those location, at which provision is made for such a coupling arrangement, without simultaneously also eliminating the liquid-tight embodiment of the line network and to cause leakages associated therewith. The electrical separation of the line network can be necessary in response to maintenance operations or in the case of insulation errors of the electrical line network, for example. When positioning the coupling arrangement in the intermediate position, the overall electrical network is separated into partial networks, so that a troubleshooting, for example of an insulation error, is highly simplified. In a further advantageous manner, provision is made for the means for securing a transition from the intermediate position into the coupled position. It is prevented through this that an unintentional connection of the coupling arrangement and an associated transition into the coupled position takes place, for example in response to maintenance or repair operations, so that the electrical connecting elements are electrically connected to one another and so that the personnel responsible for the maintenance or repair operations comes into contact with live parts. The securing means for preventing a transition from the intermediate position into the coupled position and the securing means for preventing a transition from the intermediate position into the decoupled position can also be realized as combined securing means, for example as locking mechanism, which takes over both securing functions.

In a preferred embodiment, the first and second coupling piece can be inserted into one another at least in sections. For example, the first coupling piece is embodied as a plug and the second coupling piece is embodied as a socket, wherein a continuous fluid channel or an electrical connection, respectively, is established between the coupling pieces in the coupled position when the plug is inserted into the socket. A connection of the coupling pieces, which can be handled in a simple manner, is attained through this.

In a further preferred exemplary embodiment, the first and second coupling piece in each case encompasses a housing comprising housing sections, which form sealing surfaces. On the one hand, it is attained through this that fluid flows through the entire housing interior of the coupling arrangement. On the other hand, this results in a sealing, which requires less maintenance as compared to the sealing of individual cooling channels among one another.

Preferably, the housing of one of the two coupling pieces encompasses a circumferential web, which sticks out in insertion direction and which forms a sealing surface at least in sections. For example, this web is embodied for encompassing the housing of the further coupling piece on the outer side, so that a sealing of the coupling arrangement takes place through this.

In a further preferred exemplary embodiment, one of the two coupling pieces encompasses a circumferential groove, which embodies a sealing surface at least in sections, wherein the groove is formed, for example between the housing of a coupling piece and a cap nut comprising an internal thread, which at least partially encompasses the housing. This groove is embodied for accommodating the web of the further coupling piece, wherein this web encompasses a thread on the outer side, which interacts with an internal thread of the cap nut for securing the two coupling pieces relative to one another. On the one hand, a secure fastening of the coupling pieces relative to one another and thus simultaneously a fluidic sealing of the fluid channels embodied in the coupling pieces is attained through this.

In a particularly preferred exemplary embodiment, both coupling pieces in each case encompass a coupling piece plane, which runs vertically to the insertion direction and which on an insertion area on the free end side, wherein the free end of at least one electrical connecting element, which points in the direction of the coupling piece plane, is arranged so as to be offset relative to the coupling piece plane in the direction of a coupling piece interior. It is attained by means of this offset arrangement of the electrical connecting element relative to the respective coupling piece plane that even though a liquid-tight connection of the fluid channels of the first and second coupling pieces exist in the intermediate position, the electrical connecting elements are arranged so as to be locally separated from one another and thus so as to be electrically insulated from one another.

In a further preferred exemplary embodiment, at least one of the sealing surfaces of the first and/or second coupling piece encompasses a circumferential seal, which is arranged on the free end side or substantially on the free end side in the direct vicinity of the coupling piece plane. By means of the arrangement of the seal on the edge side, the liquid-tight embodiment of the coupling arrangement is attained when positioning the first and second coupling pieces in the intermediate position.

In a further preferred exemplary embodiment, the first and second coupling piece encompasses a metallic housing, wherein the electrical connecting elements are in each case arranged in the housing so as to be electrically insulated. It is attained through this that the coupling arrangement is EMC-tight, that is, that electromagnetic radiation, which is created, for example in response to current or voltage fluctuations of the electrical energy, which is transmitted via the electrical connecting elements, is shielded, so that it cannot escape to the outside.

In a further preferred exemplary embodiment, the electrical connecting element of one of the coupling pieces is embodied in a pin-shaped manner at least in sections, for insertion into a recess of the electrical connecting element of the further coupling piece. Such an embodiment simultaneously establishes a continuous electrical connection in the coupling arrangement when the coupling pieces are inserted into one another by inserting the electrical connecting elements into one another.

In a further preferred exemplary embodiment, the securing means are arranged on one of the coupling pieces and are embodied for engaging behind a housing section of the further coupling piece at least in sections or for engaging behind elements for securing against a removal, which are arranged on the housing of the further coupling piece. A desired displacement path between the coupled position and the intermediate position is preferably furthermore released by means of the securing means, so that the coupling pieces can be pulled apart across a defined path length and a further pulling apart is blocked by engaging behind the securing means. Such securing means can be a bolt, which encompasses a projection, a clasp or a locking mechanism, for example.

In a preferred exemplary embodiment, the at least one fluid channel of the coupling pieces is arranged peripherally around the electrical connecting element, at least in sections. Through this, it is thus attained that the fluid completely surrounds the electrical conductor or the electrical connecting element, respectively, and thus a cooling of the electrical conductor. The cross sections of the electrical conductors can thus be embodied so as to be smaller, so that the coupling arrangement can be dimensioned so as to be more compact in the case of a power or current, respectively, which is to be transmitted in a defined manner. When using an insulating oil as fluid, a high insulation of the electrical connecting elements relative to the housing is further attained.

A further aspect of the invention relates to a coupling piece for a line for transmitting high power electrical energy, which encompasses at least one fluid channel and at least one electrical conductor, as well as for transmitting a pressured fluid, consisting of at least one fluid channel and at least one electrical connecting element.

Further developments, advantages and application possibilities of the invention furthermore also result from the following description of exemplary embodiments and from the figures. All of the features, which are described and/or depicted, alone or in any combination are thereby on principle the subject matter of the invention, regardless of the combination thereof in the claims or of the dependency thereof. The content of the claims is also made to form a part of the description.

Figure 1:
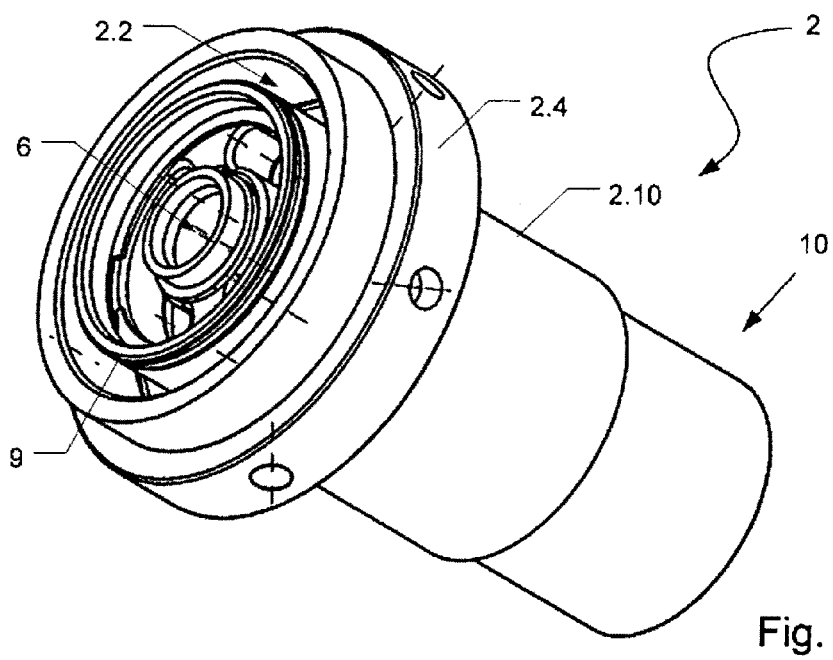
FIG. 1 shows a first coupling piece of a coupling arrangement according to the invention in an exemplary manner in a perspective view.
Figure 2:
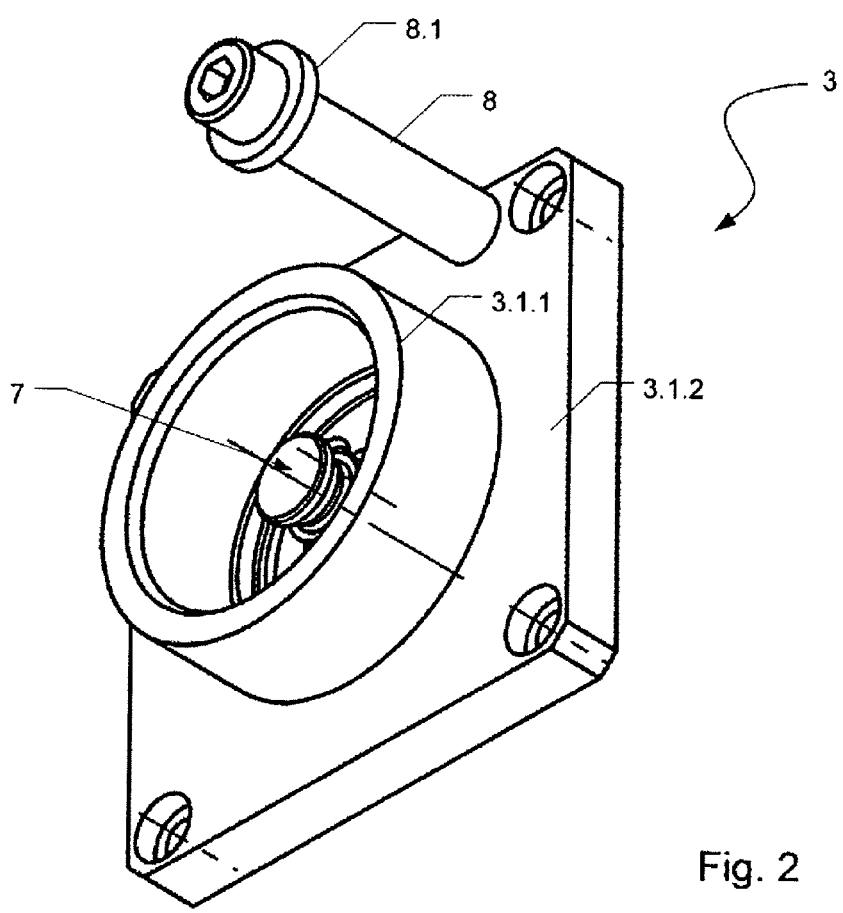
FIG. 2 shows a second coupling piece comprising securing means of a coupling arrangement according to the invention in an exemplary manner in a perspective view.
Figure 3:
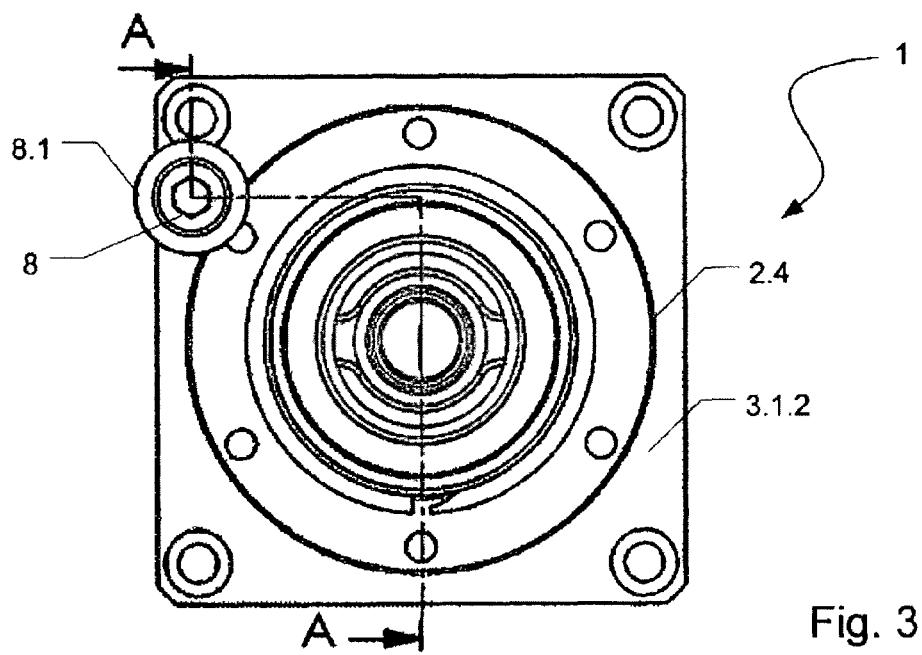
FIG. 3 shows a coupling arrangement according to the invention in a coupled position in an exemplary manner in a front top view.
Figure 4:
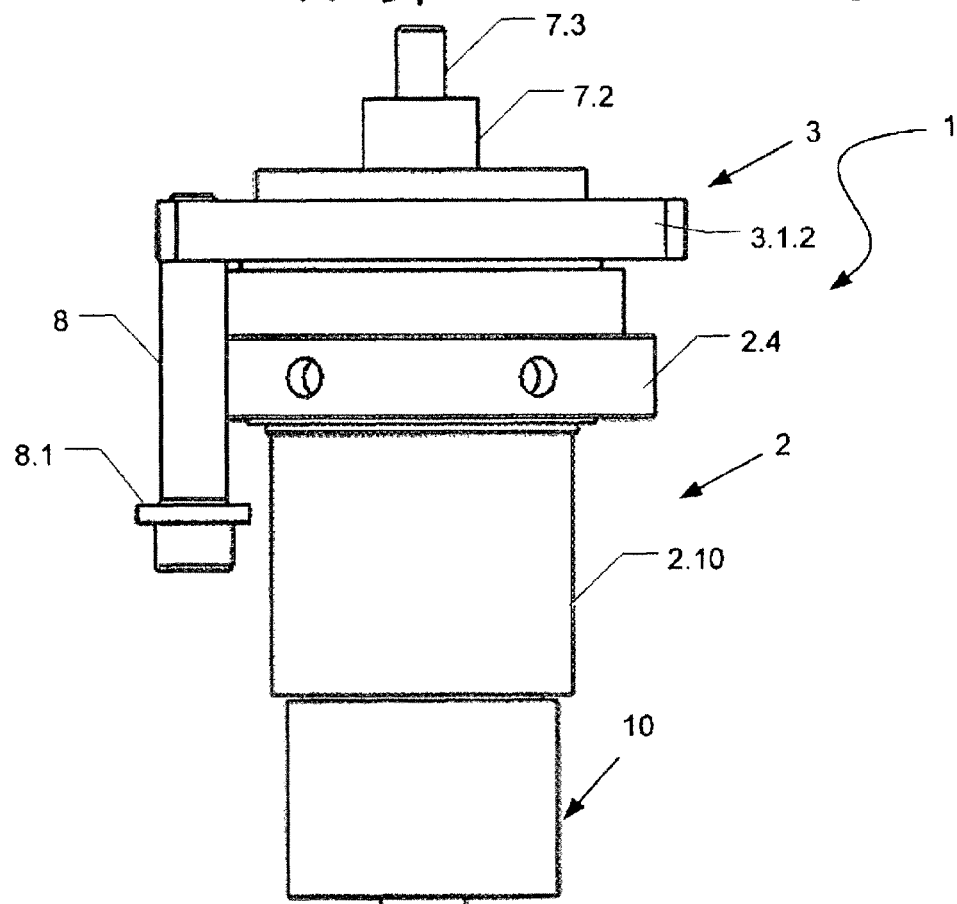
FIG. 4 shows a coupling arrangement according to the invention in a coupled position in an exemplary manner in a top view illustration.

A coupling arrangement according to the invention is shown with reference numeral 1 in FIGS. 1-7 in an exemplary embodiment.

The coupling arrangement 1 illustrated in the figures substantially consists of a first and second coupling piece 2, 3, which are embodied for simultaneously transmitting high power electrical energy of and for transmitting a pressurized fluid. The first coupling piece 2 further encompasses a coupling piece interior KR1, in which an electrical connecting element 6 is accommodated, which, in the shown exemplary embodiment, is arranged approximately in the centre along the longitudinal axis LA of the coupling arrangement 1. The first coupling piece 2 furthermore encompasses at least one fluid channel 4, which traverses the coupling piece 2 parallel to or along the longitudinal axis LA, respectively.

The second coupling piece 3 also encompasses a coupling piece interior KR2, in which an electrical connecting element 7 is accommodated, which, in the shown exemplary embodiment, is arranged so as to run centred in the second coupling piece 3 along the longitudinal axis LA. The second coupling piece 3 furthermore also encompasses at least one fluid channel 5, which provides for a cooling fluid to flow through the second coupling piece 3 along or parallel to the longitudinal axis LA, respectively, of the coupling arrangement 1.

The first and second coupling piece 2, 3 can be positioned relative to one another in a different position, namely in a coupled position and in a decoupled position.

In the coupled position, the fluid channels 4, 5 of the first and second coupling piece 2, 3 are connected to one another in a liquid-tight manner and an electrically conductive connection is established between the two electrical connecting elements 6, 7. In the decoupled position, the fluid channels 4, 5 are separated from one another, that is, they are in no way connected to one another in a liquid-tight manner. There is furthermore no electrically conductive connection between the two electrical connecting elements 6, 7 of the first and second coupling piece 2, 3.

According to the idea, which supports the invention, the coupling arrangement 1 furthermore encompasses an intermediate position, in which the first and second coupling piece 2, 3 are connected to one another in a liquid-tight manner, but no electrically conductive connection exists. In addition, the coupling arrangement 1 comprises means 8 for securing the first and/or second coupling piece 2, 3 in the intermediate position. The first and second coupling piece 2, 3 are embodied such that, in the intermediate position, they can be positioned between the coupled position and the decoupled position, in the case of which the fluid channels 4, 5 of the first and second coupling piece 2, 3 are connected to one another in a liquid-tight manner, but the electrically conductive connection is interrupted between the electrical connecting elements 6, 7. Provision is made as a safeguard against an unintentional disengaging of the first coupling piece 2 from the second coupling piece 3 in the intermediate position, for securing means 8, which prevent an unintentional displacement of the first and/or second coupling piece 2, 3 along the longitudinal axis LA.

At locations, at which a coupling arrangement according to the invention is used, a network, which guides a pressurized fluid, can thus be separated electrically, so that the troubleshooting in response to a line short-circuit can be simplified by the successive separation of network parts, namely without the escape of the fluid, which is contained in the lines.

The coupling arrangement 1 is formed according to a "plug-socket-principle", wherein the first coupling piece 2 embodies a plug and the second coupling piece 3 embodies a socket, for example. The connection of the first and second coupling piece 2, 3 to one another is carried out by means of inserting end sections of the coupling pieces 2, 3 into one another at least in sections, namely such that the respective longitudinal axes of the first and second coupling pieces 2, 3 are oriented on the same axis with their respective longitudinal axes and, together with the longitudinal axes thereof, form the common longitudinal axis LA of the coupling arrangement 1.

The first and second coupling piece 2, 3 in each case encompasses a housing 2.1, 3.1, which defines the coupling pieces 2, 3 on the outer peripheral side and which in each case defines a coupling piece interior KR1, KR2 to the outside. The housings 2.1, 3.1 encompass a continuous opening, which runs along the longitudinal axis LA of the respective coupling pieces 2, 3, or a continuous channel, respectively, in which the respective electrical connecting element 6, 7 is accommodated, in each case so as to be centred. In the shown exemplary embodiment, the electrical connecting elements 6, 7 are held at a distance to the housing 2.1, 3.1 by means of insulating elements 11, 12, which are embodied substantially in the shape of a circular ring.

The electrical connecting elements 6, 7 are embodied so as to be substantially cylindrical or so as to be cylindrical in sections, wherein the outer diameter of the electrical connecting elements 6, 7 or of the sections of the electrical connecting elements 6, 7 is smaller than the channel embodied in the housings 2.1, 3.1, so that the fluid channels 4, 5 form around the respective electrical connecting elements 6, 7, at least in sections. The insulating elements 11, 12 encompass apertures, which run along the longitudinal axis LA and through which the fluid can flow through the insulating elements 11, 12.

The housing 2.1 of the first coupling piece 2 is designed in a rotationally-symmetrical manner to the longitudinal axis LA. The first housing section 2.6 forms the insertion area, which is embodied cylindrical on the outer peripheral side, and which embodies the sealing surface 2.3 on the outer side. Provision is made in the sealing surface 2.3 for a circumferential notch, which accommodates the seal 9. The seal 9 is arranged in the direct vicinity to the free end of the first housing section 2.6, that is, it runs in a plane, which is only slightly spaced apart to the coupling piece plane KE1 on the free end side.

In the direction, which runs opposite the insertion direction SR, a second housing section 2.7, which sticks out radially relative to the first housing section 2.6, connects to the first housing section 2.6. This second housing section 2.7 is embodied so as to be staged with a first and second housing section area 2.7.1, 2.7.2, wherein the first housing section area 2.7.1 sticks out radially relative to the second housing section area 2.7.2. A cap nut 2.4, which encompasses the second housing section 2.7 and the insertion area 2.6 on the outer side, is held in a rotatable manner on the second housing section 2.7. In the area of the second housing section 2.7, the cap nut 2.4 encompasses a complementary stage as compared to the second housing section 2.7, so that a cap nut section 2.4.1 engages behind the first housing section area 2.7.1 and a displacement of the cap nut 2.4 relative to the housing 2.1 of the first coupling piece 2 is thus made impossible in insertion direction SR.

Provision is further made in the second housing section area 2.7.2 for a notch, with which a securing element, for example in the form of a securing ring 2.8, engages in sections. The section of the securing ring 2.8, which sticks out from the second housing section area 2.7.2, hereby secures the cap nut against a displacement opposite the insertion direction SR, so that the cap nut 2.4 is held so as to be secured against displacement and so as to be rotatable relative to the housing 2.1 of the first coupling piece 2.

A third housing section 2.9, which is embodied for connecting the first coupling piece 2 to a line 10, which includes an electrical conductor 10.1, connects to the second housing section 2.7 opposite to the insertion direction SR. The third housing section 2.9 is hereby embodied so as to be substantially tube-shaped and encompasses a frame 2.10 on the outer peripheral side, which is embodied so as to be tube-shaped, and which encompasses the third housing section 2.9 in a radially spaced apart manner such that a gap, the cross section of which has the shape of a circular ring, for accommodating at least a partial area of the line wall 10.2, is embodied between the third housing section 2.9 and the frame 2.10. To prevent the line 10 from disengaging from the first coupling piece 2, the line 10 is fastened to the first coupling piece 2, for example by a grouting of the frame 2.10.

The electrical connecting element 6 of the first coupling piece 2 is embodied so as to be substantially cylindrical on the outer peripheral side. It penetrates the insulation element 11 so as to be centred in a hole, which fits accurately, so that the electrical connecting element 6 is held in the housing 2.1 of the first coupling piece 2 by means of the insulating element 11, which is accommodated in the housing 2.1 so as to fit accurately. The electrical connecting element 6 is held in insertion direction SR relative to the insulating element via a radial projection 6.1 or via securing means 6.2, respectively, for example, so that a fixed arrangement thereof follows in the housing 2.1 of the first coupling piece 2 along the longitudinal axis as well.

On both front sides, which are located opposite one another, the electrical connecting element 6 in each case encompasses a blind hole-like recess 6.3, 6.4, which penetrates the electrical connecting element 6 across a partial length along the longitudinal axis of the electrical connecting element 6. The recesses 6.3, 6.4 are in each case arranged so as to be centred in the electrical connecting element 6 and thus also so as to be centred relative to the housing 2.1 of the first coupling piece 2. The recess 6.3 opens towards the coupling piece plane KE1 and is embodied for accommodating the first connecting element section 7.1 of the electrical connecting element 7 of the second coupling piece 3 so as to fit accurately. The recess 6.4, which opens on the side, which faces away from the coupling piece plane KE1, serves to accommodate the electrical conductor 10.1, that is, it forms a conductor sleeve, in which the electrical conductor 10.1 is fastened, for example grouted in.

The second coupling piece 3 also consists of a housing 3.1 and of an electrical connecting element 7, which is arranged in the housing 3.1 so as to be oriented via an insulating element 12. The housing 3.1 of the second coupling piece 3 is formed from a first and second housing section 3.1.1, 3.1.2, wherein the first housing section 3.1.1 embodies a web 3.2, having a cross section with the shape of a circular ring, of the length l. The second housing section 3.1.2 is embodied as a flange and, in the interior, encompasses a recess, which has the shape of a circular ring, and in which the insulating element 12 and the electrical connecting element 7 is arranged concentrically. The second coupling piece 3 can be attached to a housing of an electrical generator or of an electric motor, for example, by means of a screw-connection by means of the second housing section 3.1.2, for example, so that electrical energy and a fluid can be fed to or guided away from the motor or generator, respectively, via the coupling arrangement 1 according to the invention.

In the shown exemplary embodiment, the electrical connecting element 7 encompasses first to third connecting element sections 7.1, 7.2, 7.3, wherein the first connecting element section 7.1 is embodied for being inserted into the recess 6.3 of the electrical connecting element 6 of the first coupling piece 2, the second connecting element section 7.2, which sticks out radially relative to the first and third connecting element section 7.1, 7.3, is embodied for being accommodated in the insulating element 12 so as to fit accurately, and the third connecting element section 7.3 is embodied for being connected to an electrical conductor, which is arranged on the generator side or on the motor side, for example, and which encompasses an external thread for being screwed into this electrical conductor, for example. In the vicinity of its free end 7.4, the first connecting element section 7.1 preferably encompasses one or a plurality of notches on the peripheral side, which serve to accommodate ring-shaped contact elements for improving the electrical contact between the electrical connecting elements 6, 7 in the coupled state. The free end 7.4 of the first connecting element section 7.1 is offset backwards relative to the coupling piece plane KE2, namely by the backwards offset x.

The web 3.2 of the housing 3.1 supports an external thread 3.4, which is embodied for interacting with the internal thread 2.5 of the cap nut 2.4. The inner side of the web 3.2, which has a circular cross section, forms the sealing surface 3.3, which, in the coupled position of the coupling arrangement 1 (FIG. 5) and the intermediate position (FIG. 6), which is located between the coupled position and the decoupled position, comes to rest at least partially relative to the sealing surface 2.3 of the first coupling piece 2, which is provided with the seal 9, so that the fluid channels 4, 5 of the first and second coupling piece 2, 3 are connected to one another in a liquid-tight manner.

Figure 6:
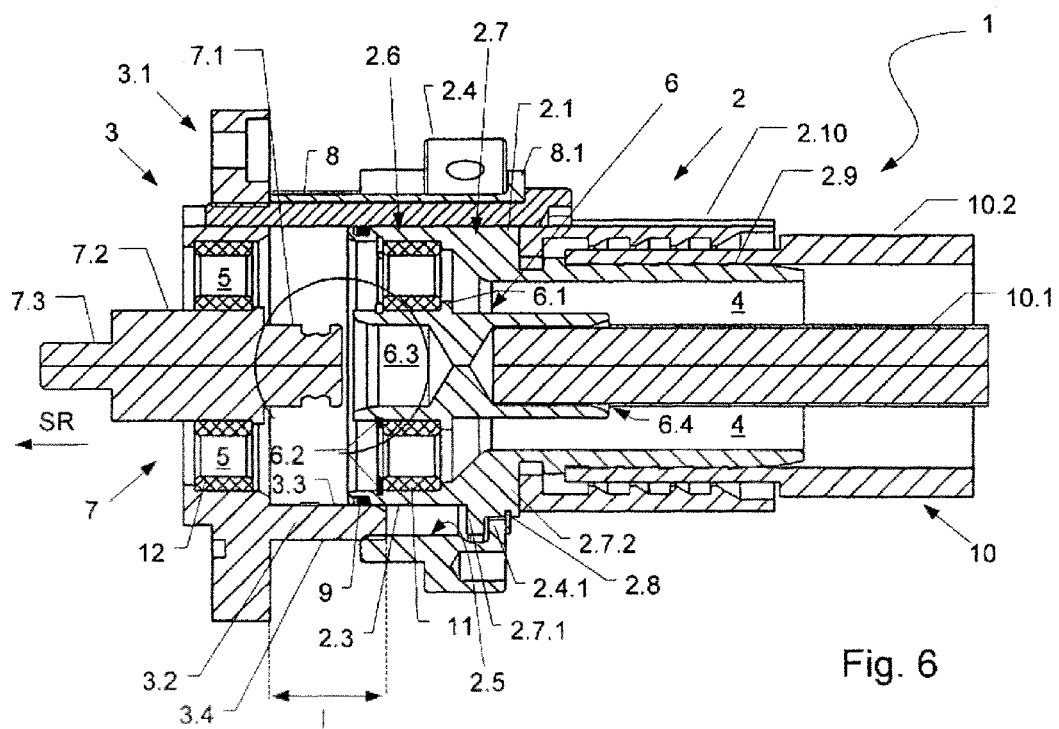
FIG. 6 shows a coupling arrangement according to the invention in an intermediate position in an exemplary manner in a lateral sectional illustration along the offset intersecting line A-A according to FIG. 3.
Figure 7:
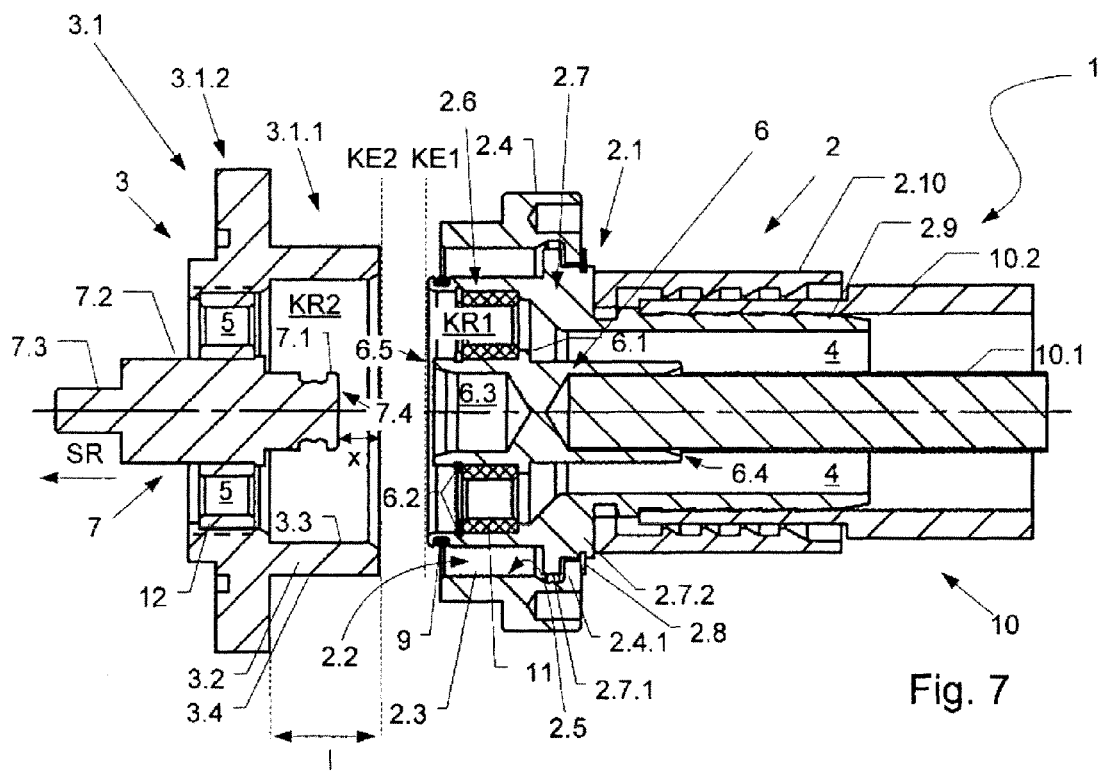
FIG. 7 shows a coupling arrangement according to the invention in a decoupled position in an exemplary manner in a lateral sectional illustration along the longitudinal axis of the coupling arrangement.

The connection or separation, respectively, of the first and second coupling pieces 2, 3 and the interaction of these coupling pieces 2, 3 with one another will be described below by means of FIGS. 5-7. FIG. 7 shows the decoupled state of the coupling arrangement 1 according to the invention, that is, the coupling pieces 2, 3 are separated from one another such that no electrical connection exists between the electrical connecting elements 6, 7 and the fluid channels 4, 5 are open towards the environment. To couple the first and second coupling pieces 2, 3, the first coupling piece 2 is positioned relative to the second coupling piece 3 such that the coupling piece planes KE1, KE2 come to rest parallel to one another or substantially parallel and the longitudinal axes of the first and second coupling pieces 2, 3 form the common longitudinal axis LA of the coupling arrangement. The first coupling piece 2 can be inserted into the second coupling piece 3 in response to this positioning, wherein, due to the backwards offset of the free end 7.4 of the electrical connecting element 7, which faces in the direction of the coupling piece plane KE2, in the direction of the coupling piece interior KR2, the web 3.3 is inserted into the groove 2.2, which is embodied between the cap nut 2.4 and the first housing section 2.6, so that a liquid-tight connection of the fluid channels 4, 5, which are embodied in the coupling pieces 2, 3 results when the seal 9 comes to rest relative to the sealing surface 3.3, but that no electrical connection is established between the electrical connecting elements 6, 7 due to the backwards offset of the free end 7.4 of the electrical connecting element 7 relative to the coupling piece plane KE2 (FIG. 6).

Figure 5:
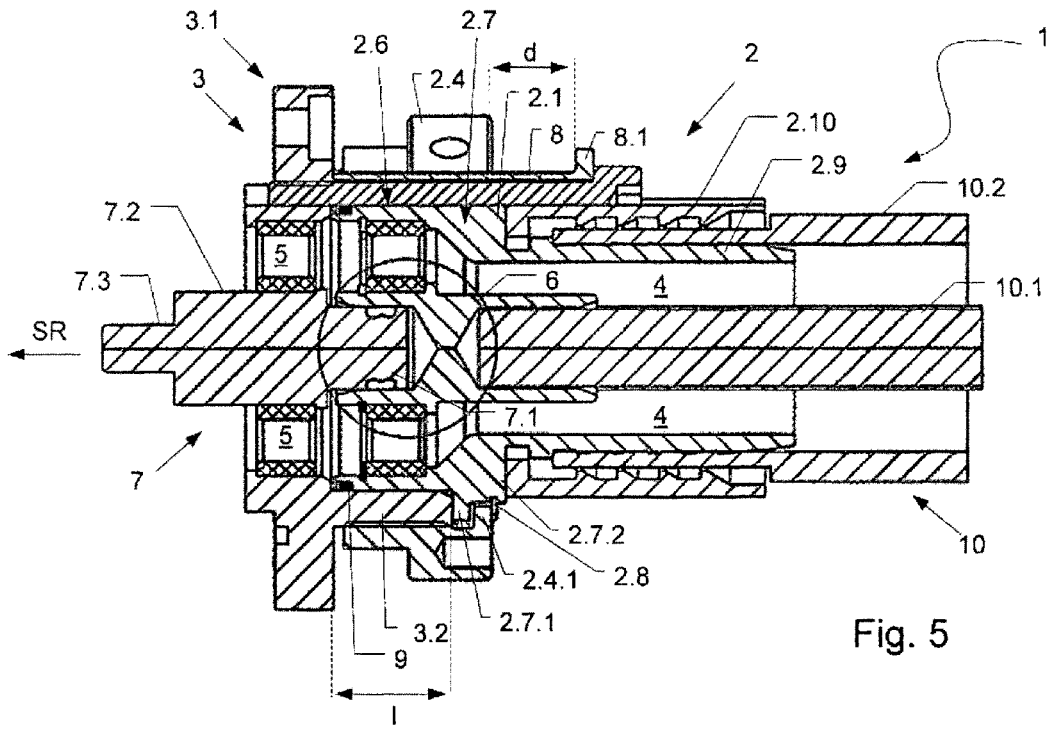
FIG. 5 shows a coupling arrangement according to the invention in a coupled position in an exemplary manner in a lateral sectional illustration along the offset intersecting line A-A according to FIG. 3.

In response to the further insertion of the first coupling piece 2 into the second coupling piece 3 by screwing the cap nut 2.4 onto the external thread of the web 3.2, the web 3.2 is guided increasingly into the groove 2.2 and the free end 7.4 of the electrical connecting element 7 is guided towards the free end 6.5 of the electrical connecting element 6, so that, in response to further insertion, the first connecting element section 7.1, which is embodied in a pin-like manner, of the electrical connecting element 7, is inserted into the recess 6.3 of the electrical connecting element 6, and an electrical connection is established between these connecting elements 6, 7 (FIG. 5). The depth t of the groove 2.2, which is measured in the direction of the longitudinal axis LA, is preferably adapted to the length l of the web 3.2, so that the web 2.2 stands on the bottom of the groove 2.2 on the front side when in the coupled position.

The transition from the coupled position (FIG. 5) into the intermediate position (FIG. 6) takes place when the cap nut 4 is unscrewed from the housing 3.1 of the second coupling piece 3. Due to the arrangement of the cap nut 2.4 relative to the housing 2.1 so as to be secured against being displaced, by means of the cap nut section 2.4.1, which is encompassed by the first housing section area 2.7.1 and the securing ring 2.8, a displacement of the housing 2.1 relative to the housing 3.1 also takes place when the cap nut 2.4 is screwed to or unscrewed from, respectively, the external thread 3.4 of the web 3.2.

In the illustrated exemplary embodiment, the securing means, which are provided as a removal protection to prevent an unintentional transition from the intermediate position into the decoupled position, are formed by means of a bolt 8, which encompasses a projection 8.1. Further removal protections, for example a locking mechanism or clasp-like securing means, are further possible as securing means. In the illustrated exemplary embodiment, the projection 8.1 of the bolt 8 is embodied for engaging behind the cap nut 2.4 in the intermediate position in sections, so that a transition of the coupling arrangement into the decoupled position is only possible after removing the securing means. In the coupled position (FIG. 5), the projection 8.1 is spaced apart from the cap nut 2.4 by the distance d, wherein the distance d is smaller than the length l of the web 3.2, but larger than the backwards offset x of the free end 7.4 of the first connecting element section 7.1 relative to the coupling piece plane KE2. Due to this dimensioning, it is attained that the web 3.2 remains inserted into the groove 2.2 in the intermediate position, when the cap nut 2.4 comes to rest on the projection 8.1 of the bolt 8 and the fluid channels 4, 5 are thus coupled to one another in a liquid-tight manner, but an electrical separation of the electrical connecting elements 6, 7 takes place.

In a preferred exemplary embodiment, the housings 2.1, 3.1 of the first and second coupling pieces 2, 3 are made of metal. By means of the metallic embodiment of the housings 2.1, 3.1, a shielding of electromagnetic radiation, which impacts the electrical connecting elements by fluctuations of the current or of the voltage, respectively, is attained against the environment. A short-circuit between the electrical connecting elements 6, 7 and the respective housings 2.1, 3.1 is effectively avoided by fixing the electrical connecting elements 6, 7 within the housing 2.1, 3.1 only via highly-insulating insulating elements 11, 12.

In a particularly preferred manner, the housings 2.1, 3.1 of the first and second coupling pieces 2, 3 are connected to one another in an electrically conductive manner in the coupled position and in the intermediate position, so that the electrical shield remains beyond the coupling arrangement in these positions.

The invention has been described above by means of an exemplary embodiment. It goes without saying that numerous modifications and changes to the invention are possible, without hereby leaving the inventive idea.

It is thus possible within the context of the invention to embody the electrical connecting element 7 with its free end 7.4 so as to be flush or substantially flush with the coupling piece plane KE2 and to offset the electrical connecting element 6 of the first coupling piece 2 relative to the coupling piece plane KE1 back into the coupling piece interior KR1, so that an electrical separation between the electrical connecting elements 6, 7 exists in turn in the intermediate position by pulling them apart.

LIST OF REFERENCE NUMERALS 1 coupling arrangement
2 first coupling piece
2.1 housing
2.2 groove
2.3 sealing surface
2.4 cap nut
2.4.1 first cap nut section
2.5 internal thread
2.6 first housing section
2.7 second housing section
2.7.1 first housing section area
2.7.2 second housing section area
2.8 securing ring
2.9 third housing section
2.10 frame
3 second coupling piece
3.1 housing
3.1.1 first housing section
3.1.2 second housing section
3.2 web
3.3 sealing surface
3.4 external thread
4 fluid channel
5 fluid channel
6 electrical connecting element
6.1 projection
6.2 securing means
6.3 recess
6.4 recess
6.5 free end
7 electrical connecting element
7.1 first connecting element section
7.2 second connecting element section
7.3 third connecting element section
7.4 free end
8 bolt
8.1 projection
9 seal
10 line
10.1 electrical conductor
10.2 line wall
11 insulating element
12 insulating element
d distance
l length
KE1, KE2 coupling piece plane
KR1, KR2 coupling piece interior
SR insertion direction
x backwards offset

The invention claimed is:

1. A coupling arrangement for a line for transmitting high power electrical energy as well as for transmitting a pressurized fluid, said line having at least one fluid channel and at least one electrical conductor, consisting of a first and second coupling piece (2, 3), in each case comprising at least one fluid channel (4, 5) and at least one electrical connecting element (6, 7), wherein, in a coupled position of the first and second coupling piece (2, 3), a liquid-light connection of the fluid channels (4, 5) and an electrically conductive connection exists between the electrical connecting elements (6, 7) and, in a decoupled position of the first and second coupling piece (2, 3), the fluid channels (4, 5) and the electrical connecting elements (6, 7) are separated from one another, characterized in that the coupling arrangement (1) encompasses an intermediate position, which is provided between the coupled and decoupled position, in which the first and second coupling piece (2, 3) are connected to one another in a liquid-tight manner, but there is no electrically conducting connection between the electrical connecting elements (6, 7) and in that provision is made for securing means (8) for preventing a transition from the intermediate position into the decoupled position, further characterized in that the first and second coupling piece (2, 3) encompasses a metallic housing (2.1, 3.1) and in that the electrical connecting elements (6, 7) are in each case arranged in the housing (2.1, 3.1) so as to be electrically insulated.

2. The coupling arrangement according to claim 1, characterized in that provision is made for securing means for preventing a transition from the intermediate position into the coupled position.

3. The coupling arrangement according to claim 1, characterized in that the first and second coupling piece (2, 3) can be inserted into one another at least in sections.

4. The coupling arrangement according to claim 1, characterized in that the first and second coupling piece (2, 3) in each case encompass a housing (2.1, 3.1) comprising housing sections (2.6, 3.2), which embody sealing surfaces (2.3, 3.3).

5. The coupling arrangement according to claim 4, characterized in that the housing (3.1) of one of the two coupling pieces (3) encompasses a circumferential web (3.2), which sticks out in insertion direction (SR) and which embodies a sealing surface (3.3) at least in sections.

6. The coupling arrangement according to claim 4, characterized in that one of the two coupling pieces (2) encompasses a circumferential groove (2.2), which embodies a sealing surface (2.3) at least in sections.

7. The coupling arrangement according to claim 6, characterized in that the groove (2.2) between the housing (2.1) of a coupling piece (2) and of a cap nut (2.4), which at least partially encompasses the housing (2.1), is formed with an internal thread (2.5), which interacts with an external thread (3.4) on the outer side of the web (3.2) of the further coupling piece (3) to secure the two coupling pieces (2, 3) relative to one another.

8. The coupling arrangement according to claim 1, characterized in that both coupling pieces (2, 3) in each case encompasses a coupling piece plane (KE1, KE2), which runs vertically to the insertion direction (SR) and on an insertion area on the free end side, and in that the free end (6.5, 7.4) of at least one electrical connecting element (6, 7), which points in the direction of the coupling piece plane (KE1, KE2), is arranged so as to be offset relative to the coupling piece plane (KE1, KE2) in the direction of a coupling piece interior (KR1, KR2).

9. The coupling arrangement according to claim 8, characterized in that at least one of the sealing surfaces (2.3, 3.3) of the first and/or second coupling piece (2, 3) encompasses a circumferential seal (9), which is arranged on the free end side or substantially on the free end side in the direct vicinity of the coupling piece plane (KE1, KE2).

10. The coupling arrangement according to claim 1, characterized in that the housings (2.1, 3.1) of the first and second coupling piece (2, 3) are connected to one another in an electrically conductive manner in the coupled position and in the intermediate position.

11. The coupling arrangement according to claim 1, characterized in that the electrical connecting element (7) of one of the coupling pieces (3) is embodied in a pin-shaped manner at least in sections, for insertion into a recess (6.3) of the electrical connecting element (6) of the further coupling piece (2).

12. The coupling arrangement according to claim 1, characterized in that the securing means (8) are arranged on one of the coupling pieces (3) and are embodied for engaging behind a housing section of the further coupling piece (2) at least in sections or for engaging behind an element (2.4) for securing against a removal, which is arranged on the housing (2.1) of the further coupling piece (2).

13. The coupling arrangement according to claim 1, characterized in that the securing means is formed by means of a bolt (8), by means of an element, which encompasses in a clamp-like manner, or by means of a locking mechanism.

14. The coupling arrangement according to claim 1, characterized in that the at least one fluid channel (4, 5) is arranged peripherally around the electrical connecting element (6, 7) of the first and/or second coupling piece (2, 3), at least in sections.

15. A coupling piece for a line for transmitting high power electrical energy as well as for transmitting a pressurized fluid, said line having at least one fluid channel and at least one electrical conductor, consisting of at least one fluid channel (4, 5) and of at least one electrical connecting element (6, 7), characterized in that the coupling piece (2, 3) is embodied for use in an arrangement according to claim 1.

* * * * *